United States Patent [19]

Zucker

[11] 4,032,231

[45] June 28, 1977

[54] MULTIPLE RANGE VARIABLE MAGNIFICATION REPRODUCTION MACHINE USING THREE-DIMENSIONAL CAM

[75] Inventor: Edwin Zucker, Rochester, N.Y.

[73] Assignee: Xerox Corporation, Stamford, Conn.

[22] Filed: May 3, 1976

[21] Appl. No.: 682,809

[52] U.S. Cl. .................................................. 355/60

[51] Int. Cl.[2] ......................................... G03B 27/54

[58] Field of Search .................. 355/49, 57, 60, 51, 355/66, 8, 11, 18

[56] References Cited

UNITED STATES PATENTS

| | | | |
|---|---|---|---|
| 3,542,467 | 11/1970 | Ferguson et al. | 355/8 |
| 3,614,222 | 10/1971 | Post et al. | 355/8 |
| 3,687,544 | 8/1972 | Müller | 355/57 |
| 3,778,147 | 12/1973 | Reehil et al. | 355/8 |
| 3,884,574 | 5/1975 | Dol et al. | 355/66 |
| 3,897,148 | 7/1975 | Ritchie et al. | 355/57 |
| 3,963,343 | 6/1976 | de Keyzer | 355/8 |

FOREIGN PATENTS OR APPLICATIONS

| | | | |
|---|---|---|---|
| 1,198,539 | 7/1970 | United Kingdom | 355/60 |

*Primary Examiner*—Donald A. Griffin

[57] ABSTRACT

A document reproduction machine having a multiple range of magnifications employs a scanning optical system which is controlled as to scanning speed and distance of travel by the selected magnification using a three-dimensional cam mechanism. In the higher reduction copying ranges the speed of the scanning optical system is automatically increased in proportion to the selected magnification reduction, and the increase in scanning distance is tailored to match expected document size to achieve a minimum amount of scanning distance.

22 Claims, 4 Drawing Figures

10
12
8
J
12'
B
85
21
21'
22
C
K
40
A
22'
L
29
30
62
66
58
52
D
26
56
48b
60
64
68
44
46
23
23'
3
3
50
48
48a
82
84
M
74
42
28
82
84
70
2
2
26
x
l
28'
M1
β
24
M2
24'
78
80
CONTROL UNIT
DIAL

MULTIPLE RANGE VARIABLE MAGNIFICATION REPRODUCTION MACHINE USING THREE-DIMENSIONAL CAM

BACKGROUND OF THE INVENTION

1. Field of the Invention

The invention is in the field of variable magnification reproduction machines.

2. Description of the Prior Art

Variable magnification reproduction machines are known in the prior art as exemplified by U.S. Pat. Nos. 3,542,467, 3,614,574, 3,778,147, 3,884,574 and 3,897,148. In U.S. Pat. No. 3,897,148, for example, discrete values of magnification are provided in a lens scanning apparatus wherein each of a plurality of cams corresponds to a single, discrete value of magnification. In machines having scanning optical systems, the selection of a desired magnification value is generally associated with a corresponding selection of optical scanning speed and distance of travel. Such correspondence is particularly present in machines using a photoreceptive surface moving at constant speeds. In such machines, to obtain smaller magnification ratios, one generally scans a document at a faster rate and also extends the distance of travel so that a larger document may be reproduced using the available photoreceptive surface. The minimum magnification value in such machines is dictated by the platen size in the scan direction.

It is also known to switch and selectively terminate platen document scanning of constant velocity scanning means prematurely for smaller documents in a fixed magnification copier, e.g. the Xerox Corporation "1000" copier.

Extending the magnification range to include still smaller magnification values has not generally been possible because of the physical size limits on the platen and reproduction machine itself and limitations of space and cost for discrete cams as in the Xerox Corporation "7000". In particular, the combination of a relatively small or conventional platen size together with small values of magnification points toward conflicting design requirements.

One method and apparatus for extending the magnification range is disclosed in co-pending U.S. application, Ser. No. 590,906, filed June 27, 1975, the whole of which application is incorporated herein by reference. The co-pending application discloses an imaging means, such as a fixed focal length leans, which is adjusted to provide a selected magnified image of an original document on a photoreceptor surface. Cooperating with the imaging means is a cam and a follower arm whose effective radius may be varied in accordance with the selected magnification value. For values of magnification within the extended smaller range of magnifications, the document scanning means increases in velocity across the document original but the extent of travel of the scanning means is terminated at the end of the platen by means of a clutch arrangement. The clutch arrangement is automatically activated for the smaller magnification values, and is not utilized for the large magnification values.

An alternate approach to providing an extended multiple range variable magnification reproduction machine is set forth in co-pending application Ser. No. 647,941, filed Jan. 12, 1976, the whole of which application is incorporated herein by reference. In this application, a multiple cam arrangement is provided wherein, each cam provides a continuous range of magnification values without the use of a clutch mechanism.

Another approach to providing a multiple range variable magnification reproduction machine is set forth herein where the single and dual cam mechanisms used in the aforementioned copending applications are replaced by a three-dimensional cam having a continuous cam surface in the axial direction which is specifically tailored to produce the desired scanning velocities and scanning distances for the chosen magnification.

SUMMARY OF THE INVENTION

It is therefore an object of the invention to overcome the disadvantages of the prior art by providing an extended variable magnification range in a reproduction machine while utilizing a platen of conventional size.

Another object of the invention is to provide a range of relatively small magnification ratios in a reproduction machine which utilizes a fixed photoreceptor travel speed.

Another object of the invention is to provide a three-dimensional cam driven scanning means in a variable magnification reproduction machine.

Yet another object of the invention is to provide a scan distance limiting means in a variable magnification reproduction machine which employs a scanning system which generally increases the speed and travel distance of optical elements with decreasing magnification.

It is a further object of the invention to provide a three-dimensional cam specifically tailored to produce a minimum scan distance for predominately used documents and magnifications thereby enabling a rapid scanning cycle with a minimum of dynamic loading forces.

The variable magnification reproduction machine which provides a continuously variable range of document magnifications has a platen for holding a document and a document scanning means for scanning a document at said platen. The document scanning means comprises a continuous cam surface for driving cam follower means. The continuous cam surface has an axially extensive portion of different angular surface configurations for providing a continuously variable range of document scanning rates. An image receptor means receives an image from the document scanned by the document scanning means, and imaging means are provided for focusing an image of the document onto the receptor means. Means are provided for adjusting the imaging means for selecting between different document magnifications and for changing the scanning rate of the document scanning means in accordance with the selected magnification. The scanning rate is adjusted by selecting one of the angular surface configurations for driving the cam follower means.

BRIEF DESCRIPTION OF THE DRAWINGS

These and other objects of the invention will be apparent from the following detailed description taken in conjunction with the figures wherein.

DETAILED DESCRIPTION OF THE PREFERRED EMBODIMENT

The variable magnification reproduction machine of the instant invention may be utilized to provide a continuously selectable magnification within a range set by machine size and physical requirements. Magnification is defined as the ratio between the image dimension and the object or document dimension. In the preferred embodiment described below, the magnification range is nominally 1.1 – 0.6. Magnifications less than unity represent physical reductions in size. Thus, a document having a dimension of 11 inches × 17 inches may be reduced using a magnification ratio of 0.647 to fit onto copy paper having a size of 8.5 inches × 11 inches.

Figure 1:
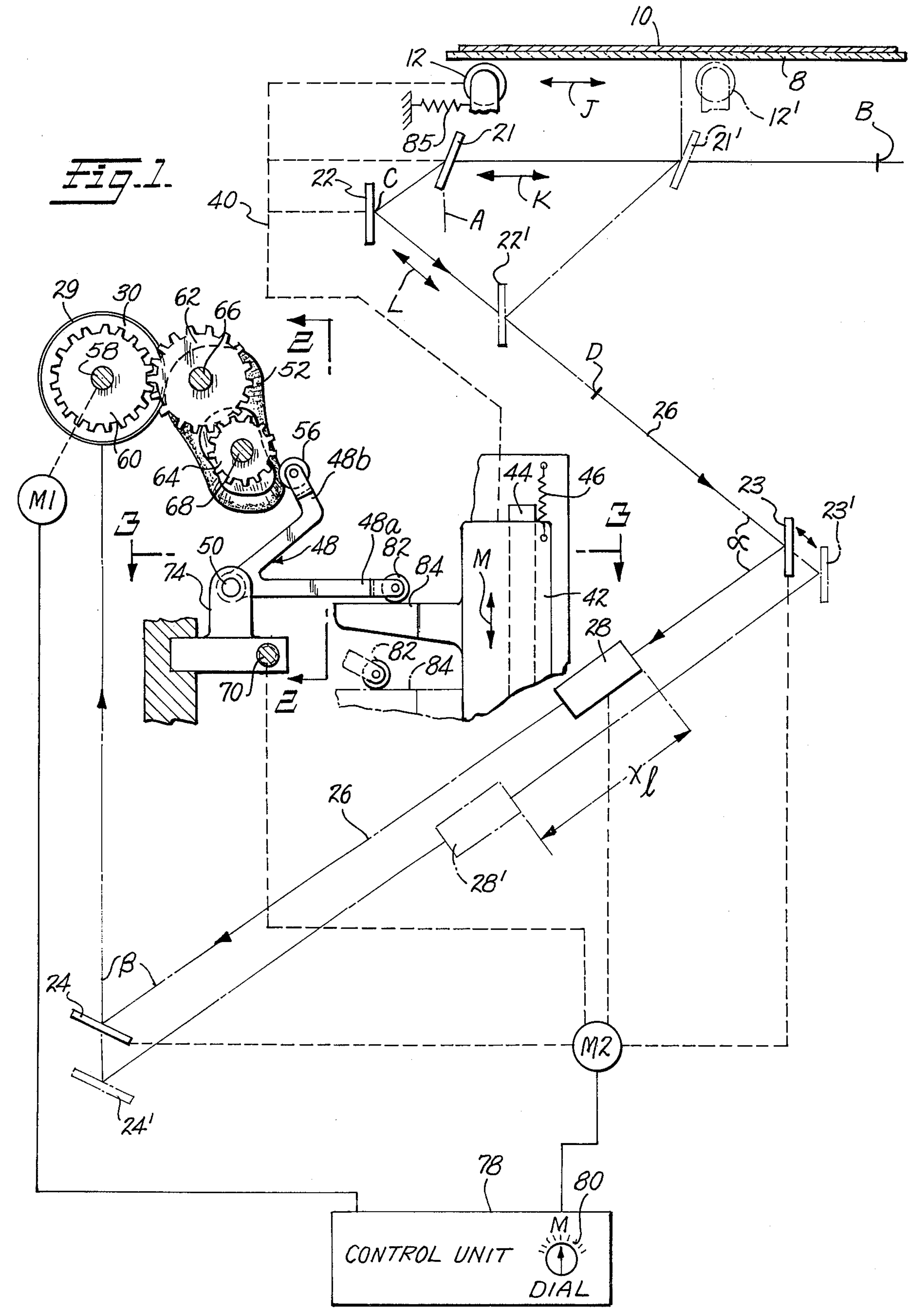
FIG. 1 is a representative view showing the principal optical and mechanical elements of the invention.

FIG. 1 is a representative view of the principal optical and mechanical elements of the instant invention. For the sake of clarity dotted lines have been utilized to show the interconnection of motors and their corresponding driven elements and to indicate the different positions of various optical elements. For a more detailed description of the mechanical supports and drive elements reference is made to the aforementioned copending applications.

Figure 2:
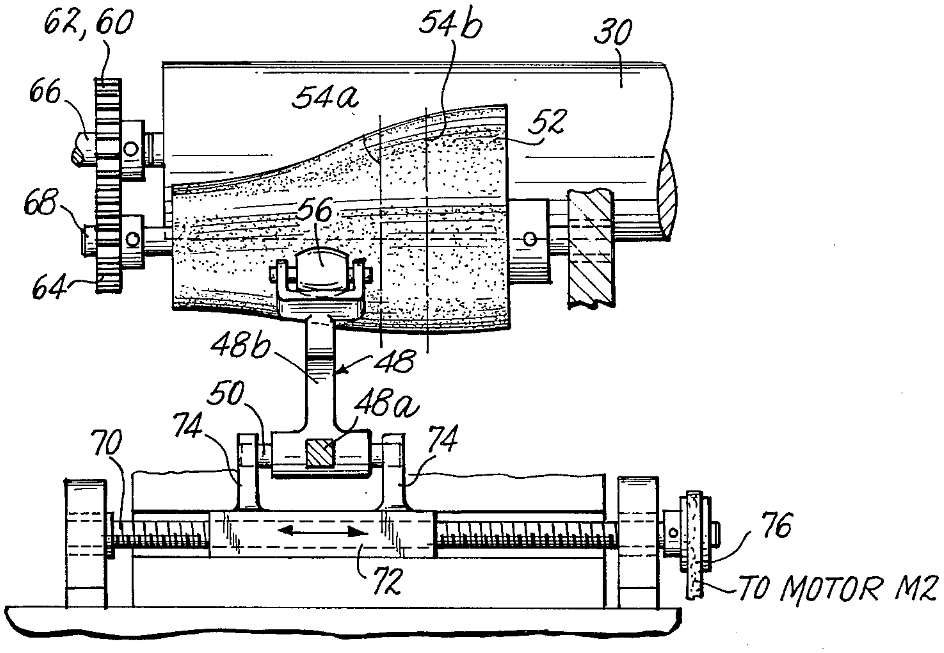
FIG. 2 is a schematic illustration of the cam surface and cam follower means taken along lines 2—2 of FIG. 1.
Figure 3:
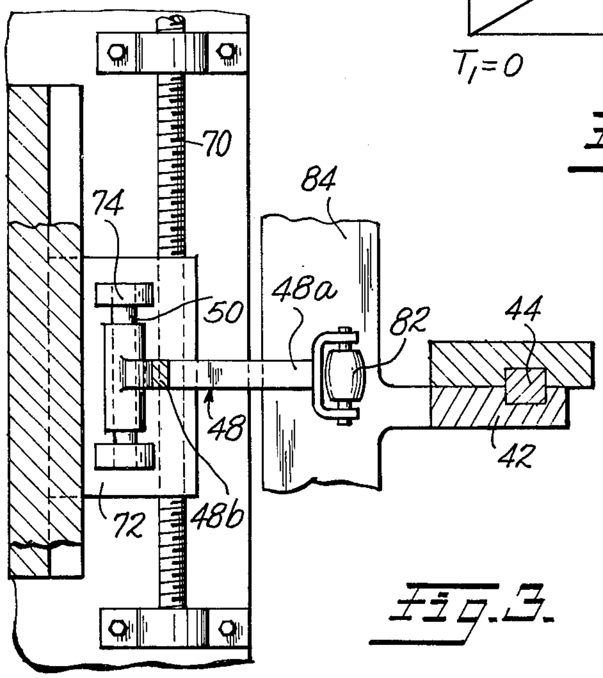
FIG. 3 is an illustration of the cam follower means taken along lines 3—3 of FIG. 1.

As shown in FIGS. 1–3, the apparatus has a document holding means comprising a platen 8 on which a document 10 is positioned and illuminated for reproduction. The document is illuminated by a lamp 12 which scans across the surface of the platen as illustrated by the arrow J. The optical system comprises first, second, third and fourth mirrors designated 21, 22, 23 and 24, respectively. Mirrors 21 and 22 are scanning mirrors in that they move relative to the document 10 in synchronism with the movement of lamp 12. The arrows K and L adjacent mirrors 21 and 22, respectively, indicate the direction of scan for these mirrors. The optical path of light reflected from the mirror surfaces is indicated by numeral 26 and is seen to extend from the document 10 to scanning mirrors 21 and 22 and subsequently to mirror 23. A lens 28, for example, of the fixed focal length type, is positioned to intersect the light path 26, and the light image is subsequently reflected by means of mirror 24 to a photoreceptor surface 29 of, for example, a xerographic drum 30.

FIG. 1 also illustrates a second position for the scanning mirrors which is designated by numerals 21′ and 22′ corresponding to an intermediate point in the scan cycle. During one complete scan cycle, the mirror 21 moves from its start of scan position at point A to a point B which depends on the magnification setting, and back again to the start of scan position. At the same time, and in synchronism therewith, mirror 22 moves from its starting position at point C to point D, which likewise depends on the magnification setting, and returns along the same path to point C. As can be seen in the drawings, the angular orientation of mirrors 21 and 22 remains fixed during a scan cycle and only their displacement relative to the document surface is changing. The attitude of the optical path 26 extending from mirrors 22 to mirror 23 remains fixed in position for any given displacement of the mirrors 21 and 22. The geometry shown provides a constant optical path length from the platen 8 to the leans 28 during every position of the scanning mirrors 21 and 22 during the scan cycles. As such, the horizontal component of the velocity of mirror 22 is one-half the velocity of scanning mirror 21.

FIG. 1 further shows the lens and mirror arrangement for a different magnification setting of the reproduction machine. Thus, numeral 23′ indicates the position of mirror 23 at an alternative magnification value as does numerals 28′ and 24′ indicate the new position for the lens 28 and mirror 24, respectively. The movement of mirrors 23 and 24 and lens 28 is continuously variable to achieve continuously variable magnification within the available range. Lens 28 has a fixed focal length, 14 inches, for example, and the lens and mirror arrangement maintain a focused image on the receptor means or photoreceptive surface 29 in a variable conjugate system. The mirror and lens movement is achieved by means of a common drive mechanism and separate cam arrangements as is described in detail in the aforementioned copending applications.

Mirrors 21 and 22 together with the lamp 12 are mechanically linked together as indicated by line 40 to be driven by a trolley 42. Trolley 42 is mounted on a rail 44 for reciprocating movement as shown by the arrow M. One complete cycle of trolley 42 corresponds to a complete scanning cycle of mirrors 21 and 22 and lamp 12. The rail 44 is fixed on a suitable support attached to the machine housing. The trolley 42 is biased by a spring 46 to move in an upward direction along rail 44. As shown in FIG. 1, trolley 42 is positioned near the limit of its upward travel. The downward motion of trolley 42 results from the clockwise rotation of cam follower means 48 about a shaft 50. The trolley 42 and cam follower means 48 are shown enlarged in scale for ease of illustration. Cam follower means 48 is shown as having a cam follower arm having two portions identified by numerals 48*a* and 48*b*. The cam follower means 48 is driven by a cam 52 having an axially extensive portion of different angular surface configurations. Two such angular surface configurations are shown by arcs 54*a* and 54*b* of FIG. 2, where each arc is representative of the locus of cam cutting radii. Each angular surface configuration corresponds to a different scanning rate and scanning distance of the variable magnification reproduction machine. Cam arm portion 48*b* has a roller 56 secured for rotation at one end thereof. The roller 56 makes contact with the surface of cam 52, and upon rotation of the cam 52 the center of roller 56 executes a complete closed arc (arc 54*a* for example) which defines an angular surface configuration. Rotation of the cam 52 is achieved by means of a motor M1 which drives a drive shaft 58 of xerographic drum 30, and by a plurality of gears 60, 62 and 64. Gear 60 is mounted to drive shaft 58 and is consequently driven by motor M1. Gear 62 is mounted on a shaft 66 and meshes with gear 64 which is fixed to shaft 68. Cam 52 is also fixed to shaft 68 and rotates therewith. The geometries of gears 60, 62 and 64 determine the speed ratio between the drum 30 and cam 52. In practice, the diameter of drum 30 is approximately 243 mm and the major diameter for the cam is approximately 203 mm.

The cam follower means 48 is mounted for axial movement along a shaft or fulcrum screw 70. Threaded block 72 is driven in the direction of the arrow shown in FIG. 2, and block 72, in turn, moves the cam follower means 48 which is supported by brackets 74 and the shaft 50. Rotation of fulcrum screw 70 is achieved by means of a drive belt 76 shown in FIG. 2 which is connected to motor M2. FIG. 1 indicates the motor connection by means of dotted lines. Thus motor M2 simultaneously drives the fulcrum screw 70 as well as mirrors 23 and 24 and lens 28. Motors M1 and M2 are activated by a control unit 78 having a magnification selection means 80 therein.

As shown most clearly in FIG. 3, cam follower arm portion 48a has a roller 82 rotatably mounted to an end thereof similar to roller 56 on arm portion 48b. Roller 82 bears against surface 84 of trolley 42 to move trolley 42 downward as seen in FIG. 1.

Rotation of drive shaft 58 (in a clockwise direction) thus produces a clockwise rotation of cam 52 and reciprocating rotation of cam follower means 48. Clockwise pivot of cam follower means 48 in turn causes a downward movement of trolley 42 and a corresponding scanning movement of mirrors 21 and 22 as well as lamp 12. After document scanning, the cam follower means 48 is pivoted in a counterclockwise direction by the bias force supplied from trolley 42 via spring 46. Additional "flyback" biasing is provided by additional spring means 85 shown attached between lamp 12 and the apparatus housing.

To produce a change in magnification, the operator changes the magnification selection means 80 on the control unit 78. Any value within the avilable continuous magnification range may be selected inasmuch as the apparatus is not restricted to discrete magnification values.

Upon selecting a magnification value the control unit 78 actuates a motor M2 which drives the mirrors 23 and 24 and lens 28 to their appropriate position corresponding to the magnification selected. For example, in decreasing the magnification, lens 28 moves to position 28', mirror 23 to position 23' and mirror 24 to position 24'. At the same time, motor M2 turns fulcrum screw 70 and drives the cam follower means 48 axially along cam 52 so that roller 56 makes contact with an angular surface configuration, such as the one described by arc **54*b* of FIG. 2. A decrease in magnification corresponds to the cam follower means 48 moving to the right in FIG. 2, as for example from arc 54*a* to arc 54*b*, so that a larger scanning rate as well as larger scanning distance is achieved. The larger radial extension of arc 54*b* relative to arc 54*a* drives trolley 42** at a faster rate producing a corresponding faster rate of document scan.

Figure 4:
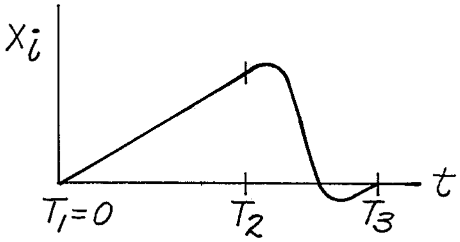
FIG. 4 is a position-time graph of the movement of mirror 21 of FIG. 1.

The surface of cam 52 is specifically tailored such that each angular surface configuration (the cam contour of an axial cross section of the cam) defines a particular scanning rate and scanning distance corresponding to a particular magnification. It is generally desirable to obtain the most conservative dynamic and spatial movement of mirrors 21 and 22 such that they only scan the minimum scan distance $X_s$ to achieve full document scan at each selected magnification value. During document scanning, the constant velocity (after acceleration) of mirror 21 (image velocity) is given by $V_i = V_{pc}/M$ where $V_{pc}$ is the velocity of photoreceptor surface 29 and M is the selected magnification. The displacement $X_i$ of mirror 21 with respect to time during a given cycle is represented in FIG. 4 where $T_1$ ($T_1 = 0$) corresponds to the start of the constant velocity motion of mirror 21, $T_2$ corresponds to the end of the constant velocity motion of mirror 21 near the end of scan position, and $T_3$ corresponds to the return of mirror 21 to the start of scan position. $T_3$ is simply the reciprocal of the machine copy rate. The preferred shape of the return motion for mirror 21 is a seventh order polynomial and thus one may write:

$$X_i = V_i \cdot t = \frac{V_{pc}}{M} \cdot t \qquad O \leq t \leq T_2 \qquad (1)$$

$$X_i = C_7 t^7 + C_6 t^6 \ldots + C_1 t + C_0 \qquad T_2 < \leq T_3 \qquad (2)$$

The coefficients of $C_7$, $C_6$, . . . $C_0$ may be determined from the following boundary conditions.

| t | $X_i$ | $\dot{X}_i$ | $\ddot{X}_i$ | $\dddot{X}_i$ |
|---|---|---|---|---|
| $T_2 = \frac{(X_s + SW)}{V_{pc}} \cdot M$ | $(X_s + SW)$ | $V_i = \frac{V_{pc}}{M}$ | 0 | 0 |
| $T_3$ | 0 | $V_i = \frac{V_{pc}}{M}$ | 0 | 0 |

SW is an object plane slit aperture width typically = 13 mm., $T_3$ is typically 1 second and $V_{pc}$ is = 381 mm/sec. The minimum scanning distance $X_s$ depends upon the particular document dimensions most predominantly used with the corresponding predominantly used magnification. $X_s$ is smoothed by interpolation, as a function of M, for other document sizes and mignifications. For example, the table below shows predominantly used document sizes in the U.S. and Europe, the predominantly desired magnifications and the resulting image sizes.

TABLE

| Case | M | Document size (mm) Width-Length | Image Size On Copy Sheet (mm) Width-Length | $x_s$ (mm) | $x_s$ + SW (mm) |
|---|---|---|---|---|---|
| A | 1 | 216–356 | 216–256 | 216 | 229 |
| B | .752 | 279–378 | 210–284 | 279 | 292 |
| C | .74 | 278–378 | 207–279 | 279 | 292 |
| D | .707 | 297–420 | 210–297 | 297 | 310 |
| E | .647 | 278–432 | 181–279 | 279 | 292 |

Case A corresponds to unity magnification. Cases B and C correspond to a computer form document reduction using two different magnifications. Cases D and E correspond to other predominantly used document sizes. It is noted that $X_s$ is optimally chosen to be the document width. The last column lists values of $X_s$+SW where SW is the slit width of the scanning optical system, and is here given by SW = 13 mm as an example. Thus, The actual constant velocity scan distance of the optical system is $X_s$+SW, which, since SW is small, is approximately equal to the distance $X_s$.

The coordinate Z (along the axis of cam 52) is a function of magnification M. Utilizing a linear kinematic connection (a belt or geared linear connection as opposed to a non-linear lever or cam) of motor M2 to the threaded block 72 results in making Z proportional to $\phi_{m2}$, the angular displacement of motor M2. Thus, $Z = A\phi_{m2}$ where A is a constant equal to the reciprocal of the mechanical advantage between block 72 and motor M2. Motor M2 also drives lens 28, and the displacement, $X_1$ of lens 28 along optical axis 26 is given as a non-linear function of magnification $X_1 = f(M)$. Function $f(M)$ is determined by the particular lens focal length and arrangement of mirrors 23 and 24, and for FIG. 1, it can be shown that $$f(M) = F\left[\left(\frac{M^2 + 2M + 1}{M} - 4\right)\left(\frac{\cot\beta + \csc\beta}{\cot\beta + \csc\beta + \cot\alpha + \csc\alpha}\right) - (M - 1)\right], \quad (3)$$

where F is the focal length of lens 28.

It is expedient to linearly connect the lens driving means to motor M2, and thus $\phi_{m2}=BX_1=Bf(M)$, where B is the mechanical advantage between motor M2 and lens 28. Thus, the variation of Z as a function of magnification is simply $$Z = ABf(M) \quad (4).$$

Using equations (1), (2) and (4) above, the polar coordinates (R, $\phi$, Z) of the surface of cam 52 may be determined for the particular kinematic arrangement between mirror 21 and cam 52, where R is the cam cutting radius, $\phi$ = cam angle, and Z = cam axial dimension.

The utilization of the three-dimensional cam 52 specifically tailored to produce the minimum scan distances $X_s$ for predominantly used documents and magnifications enables a more rapid scanning cycle with less dynamic load forces than single or multiple discrete cam machines. The cam with its axially variable cam geometry causes the scanning rate and scanning distance across the platen to increase inversely with decreasing magnification, with scanning distance limited to the smaller of the document width or platen width. Additionally, a minimum scanning distance results in small space requirements and corresponding cost reduction. A further advantage of the three dimensional cam rests in a simple mechanism for achieving scan distance control and velocity control without the need to alter the effective radius of the cam follower arm, as necessary, for example in the aforementioned co-pending applications.

It is evident that the principles of the reproduction machine of the instant invention may be incorporated in alternate optical systems such as those disclosed in U.S. Pat. Nos. 3,499,374, and 3,697,166. Thus, the scanning direction need not be at right angles to the axis of revolution of the photoreceptor surface, but may be oriented parallel thereto, or in any other attitude.

It is also evident that a zoom lens may be utilized in place of a fixed focal length lens and that the motor for driving the zoom lens can also drive the document scan regulating means and control the scan length.

Although the invention has been described with reference to the preferred embodiments, it is to be understood that changes and modifications may readily be made by those skilled in the art without deviating from the spirit and scope of the present invention defined by the appended claims.

I claim:

1. A variable magnification reproduction machine for providing a continuously variable range of document magnifications comprising:

a. a platen for imaging a document, b. document scanning means for scanning a document at said platen, said document scanning means comprising:

1. an effectively continuous cam surface having an axially extensive portion of different angular surface configurations, said different configurations providing a continuously variable range of document scanning rates, and 2. cam follower means for contacting said cam surface, for controlling the scanning rate and scanning distance of said document scanning means with said cam surface by movement of said cam surface relative to said cam follower means, c. image receptor means for receiving an image of said document scanned by said document scanning means, d. imaging means for focusing an image of said document onto said receptor means, e. means for adjusting said imaging means for selecting between different document magnifications, and f. means responsive to the selected magnifications for selecting one of said angular surface configurations for said contact by said cam follower means.

2. A variable magnification reproduction machine as recited in claim 1 wherein said means for selecting one of said angular surface configurations is automatically cooperated with the means for adjusting said imaging means.

3. A variable magnification reproduction machine as recited in claim 1 wherein said cam follower means comprises a cam follower arm and said means for selecting one of said angular surface configurations comprises means for positioning said cam follower arm and said selected angular surface configuration for contact with one another.

4. A variable magnification reproduction machine as recited in claim 3 wherein said cam follower means further comprises means for axially moving said cam follower arm and said cam surface relative to one another.

5. A variable magnification reproduction machine as recited in claim 4 wherein said cam surface is secured for rotation about a shaft and said cam follower arm is secured for rotation about a shaft disposed substantially parallel to said cam surface shaft.

6. A variable magnification reproduction machine as recited in claim 5 wherein said means for axially moving said cam follower arm and said cam surface relative to one another comprises means for moving said cam follower arm relative to said cam surface.

7. A variable magnification reproduction machine as recited in claim 6 wherein said document scanning means comprises a trolley mounted for reciprocal movement for driving mirror scanning means, said trolley driven by said cam follower arm.

8. A variable magnification reproduction machine as recited in claim 1 wherein said continuous range of magnification is approximately 1.01 – 0.647.

9. A variable magnification reproduction machine as recited in claim 1 wherein said different angular surface configurations have a maximum radial dimension for cooperating with said cam follower means for limiting the scanning of said document scanning means to approximately the platen size.

10. A variable magnification reproduction machine as recited in claim 1 wherein said different angular surface configuration have a maximum radial dimension for cooperating with said cam follower means for limiting the scanning of said document scanning means to approximately a predetermined document size for each of a plurality of selected magnifications.

11. A variable magnification reproduction machine as recited in claim 10 wherein said means for selecting one of said angular surface configurations is automatically cooperated with the means for adjusting said imaging means.

12. A variable magnification reproduction machine as recited in claim 11 wherein said cam follower means comprises a cam follower arm and said means for selecting one of said angular surface configurations comprises means for positioning said cam follower arm and said selected angular surface configuration for contact with one another.

13. A variable magnification reproduction machine as recited in claim 12 wherein said cam follower means further comprises means for axially moving said cam follower arm and said cam surface relative to one another.

14. A variable magnification reproduction machine as recited in claim 13 wherein said cam surface is secured for rotation about a shaft and said cam follower arm is secured for rotation about a shaft disposed substantially parallel to said cam surface shaft.

15. A variable magnification reproduction machine as recited in claim 14 wherein said means for axially moving said cam follower arm and said cam surface relative to one another comprises means for moving said cam follower arm relative to said cam surface.

16. A variable magnification reproduction machine as recited in claim 15 wherein said document scanning means comprises a trolley mounted for reciprocal movement for driving mirror scanning means, said trolley driven by said cam follower arm.

17. A variable magnification reproduction machine as recited in claim 16 wherein said continuous range of magnification is approximately 1.01 – 0.647.

18. A variable magnification reproduction machine as recited in claim 1 wherein said imaging means comprises a lens, means responsive to the selected magnification for adjusting the lens and said image adjusting means automatically cooperating with said means for selecting one of said angular surface configurations.

19. A variable magnification reproduction machine as recited in claim 1 wherein said imaging means is fixed during scanning of said document by said document scanning means.

20. A variable magnification reproduction machine as recited in claim 19 wherein said different angular surface configuration have a maximum radial dimension for cooperating with said cam follower means for limiting the scanning of said document scanning means to approximately a predetermined document size for each of a plurality of selected magnifications.

21. A variable magnification reproduction machine as recited in claim 1 further comprising means for rotatably driving said cam about an axis of rotation for driving said cam follower means with a selected one of said angular surface configurations and wherein said angular surface configurations comprise annular paths eccentric the cam's axis of rotation.

22. A variable magnification reproduction machine as recited in claim 21 wherein said means for selecting one of said angular surface configurations is automatically cooperated with the means for adjusting said imaging means.

* * * * *